US010322779B2

(12) United States Patent
Mitsuru

(10) Patent No.: US 10,322,779 B2
(45) Date of Patent: Jun. 18, 2019

(54) DEVICE FOR MEASURING DIFFERENCE BETWEEN DRAFTS ON TWO SIDES OF SHIP

(71) Applicant: Kouichiro Mitsuru, Kimitsu (JP)

(72) Inventor: Kouichiro Mitsuru, Kimitsu (JP)

(*) Notice: Subject to any disclaimer, the term of this patent is extended or adjusted under 35 U.S.C. 154(b) by 115 days.

(21) Appl. No.: 15/556,570

(22) PCT Filed: Apr. 17, 2015

(86) PCT No.: PCT/JP2015/061821
§ 371 (c)(1),
(2) Date: Sep. 7, 2017

(87) PCT Pub. No.: WO2016/151871
PCT Pub. Date: Sep. 29, 2016

(65) Prior Publication Data
US 2018/0050771 A1 Feb. 22, 2018

(30) Foreign Application Priority Data
Mar. 24, 2015 (JP) .................................. 2015-079588

(51) Int. Cl.
G01C 9/18 (2006.01)
B63B 39/14 (2006.01)
(Continued)

(52) U.S. Cl.
CPC .............. *B63B 39/12* (2013.01); *B63B 39/14* (2013.01); *G01C 5/04* (2013.01); *G01C 9/18* (2013.01); *G01C 9/22* (2013.01)

(58) Field of Classification Search
CPC ........... B63B 39/12; B63B 39/14; G01C 5/04; G01C 9/18; G01C 9/22
(Continued)

(56) References Cited

U.S. PATENT DOCUMENTS 2,142,124 A * 1/1939 Gardner .................... G01C 1/10
33/283
4,169,320 A * 10/1979 Bennett .................... G01C 5/04
33/347
(Continued)

FOREIGN PATENT DOCUMENTS

DE 4413781 A1 * 10/1995 ............... B63B 9/08
JP 60235013 11/1985
(Continued)

OTHER PUBLICATIONS

English Abstract of JP2011137776.
(Continued)

*Primary Examiner* — Son T Le
*Assistant Examiner* — Herbert K Roberts
(74) *Attorney, Agent, or Firm* — Preston Smirman; Smirman IP Law, PLLC

(57) ABSTRACT

The objective of the invention is to improve the durability and reduce the weight of a device for measuring the difference between the drafts on the two sides of ship, by making it possible to prevent the occurrence of bubbles in a measuring liquid and prevent leakage of the measuring liquid. In order to measure the difference between the drafts on the two sides of a ship, a measuring device (1) is provided with: two liquid level measuring tubes (11) attached respectively to the port and starboard sides of the ship; a communicating hose (41) which causes the two liquid level measuring tubes (11) to communicate with one another; and a drum (51) to which a central portion of the communicating hose (41) is secured, and onto which a left hose section (41a) and a right hose section (41b) are wound simultaneously. In order to bend the central portion of the communicating hose (41) into a U-shape to catch said central portion, the measuring device (1) includes a hose catching projection (51c) which protrudes from an outer peripheral surface of a shaft member
(Continued)

(51a) of the drum (51), and a resin coil spring (42) mounted on the central portion of the communicating hose (41).

8 Claims, 7 Drawing Sheets

(51) Int. Cl.
*B63B 39/12* (2006.01)
*G01C 5/04* (2006.01)
*G01C 9/22* (2006.01)

(58) Field of Classification Search
USPC .......................................... 33/367; 73/865.2
See application file for complete search history.

(56) References Cited

U.S. PATENT DOCUMENTS

| | | | | | |
|---|---|---|---|---|---|
| 4,231,163 | A | * | 11/1980 | Turloff | G01C 5/04 33/366.11 |
| 4,384,410 | A | * | 5/1983 | Melugin | G01C 5/04 33/367 |
| 4,422,244 | A | * | 12/1983 | Gauthier | G01C 5/04 33/367 |
| 2014/0301807 | A1 | * | 10/2014 | Hallot | B63B 27/34 414/137.9 |

FOREIGN PATENT DOCUMENTS

| | | |
|---|---|---|
| JP | 1284706 | 11/1989 |
| JP | 387611 | 4/1991 |
| JP | H451618 | 4/1992 |
| JP | H457712 | 5/1992 |
| JP | H7301624 | 11/1995 |
| JP | 2002538025 | 11/2002 |
| JP | 2005139573 | 11/2006 |
| JP | 2011137776 | 7/2011 |
| JP | 6054226 B2 * | 12/2016 |

OTHER PUBLICATIONS

English Abstract of JP387611.
English Abstract of JP1284706.
English Abstract of JP60235013.
English Translation of Claims of JPH457712.
English Abstract of JPH7301624.
English Translation of Claim of JP2002538025.
English Abstract of JP2005139573.
International Preliminary Report on Patentability dated Sep. 26, 2017.
International Search Report dated Jul. 7, 2015.
Translation of International Search Report dated Jul. 7, 2015.
Written Opinion of International Searching Authority dated Jul. 7, 2015.
Translation of Written Opinion of International Searching Authority dated Jul. 7, 2015.

* cited by examiner

FIG.5 (a) (b) Enlarged cross-section taken along line IV (c)

Conventional Art

DEVICE FOR MEASURING DIFFERENCE BETWEEN DRAFTS ON TWO SIDES OF SHIP

CROSS-REFERENCE TO RELATED APPLICATION

The instant application is a national phase of PCT International Application No. PCT/JP2015/061821 filed Apr. 17, 2015, and claims priority to Japan Patent Application Serial No. 2015-079588, filed Mar. 24, 2015, the entire specifications of both of which are expressly incorporated herein by reference.

TECHNICAL FIELD

The present invention relates to an instrument for measuring draft difference between portside and starboard of a vessel.

BACKGROUND ART

The draft is a vessel's waterline, which equals the vertical distance between the keel and the water surface (depth). Inclination in the breadth direction of the vessel (heel) causes draft difference between portside and starboard. The draft difference can be obtained by reading draft marks which are placed on both sides of the vessel. Reading the draft on the shore side is easy, while on the sea side is difficult. As substitute for reading the marks, there is a well-known instrument for easily measuring draft difference on the deck (Patent Literature 1). Based on measurements obtained by using the instrument, it is possible to know the degree of inclination in the breadth direction of the vessel and to calculate an angle of inclination.

The principle of measuring draft difference between both sides on the deck is the same as those disclosed in Patent Literatures 2-7. The principle is briefly described as follows. When two reservoirs containing liquid to be used for measuring, such as water or the like, (hereinafter referred to as "measuring liquid") are placed apart from each other and connected through a hose, etc., both liquid levels are even. Then calculating the difference in the height from the surface on which each reservoir is placed to the liquid level represents the elevation difference in two places. The instruments disclosed in Patent Literatures 2-7 are for onshore use but not for measuring draft difference between both sides of a vessel.

The inclination measuring instrument of Patent Literature 1 is provided with two tubular liquid-level gauges corresponding to the two reservoirs in the principal and a long transparent flexible tube (instead of this term in Patent Literature 1, "communicating hose" is used herein) for communicating the gauges at their lower ends. The inclination measuring instrument is filled with liquid not generating air bubbles. When used in a large vessel, the length of the hose reaches tens of meters. When not in use, the hose is wound on a drum in duplex with the central portion of the hose in the length direction as starting end.

Patent Literature 1 describes the communicating hose as being "one" hose; however, this is no more than a principled description. The hose is actually arranged as shown in FIG. 7.

FIG. 7 shows conventional art for winding the communicating hose on a drum in duplex in a schematic view of only main parts of a drum 100.

The drum 100 is provided with a spindle 101, a pair of disks 102 at both ends of the spindle, and a handgrip 103 at one side. The spindle 101 has a closed hollow 104 inside and is provided with a forked pipe 105 projecting from the outer periphery. The base end of forked pipe 105 opens into the hollow 104. The other end of the forked pipe 105 diverges into joints 106a and 106b. One end of a left hose 107a is fixed to one of joints 106a, and one end of a right hose 107b is fixed to the other joint 106b. The other end of left hose 107a is connected to the tubular liquid-level gauge (not shown) installed on the portside, and the other end of right hose 107b is connected to the tubular liquid-level gauge (not shown) installed on the starboard.

The communicating hose used in conventional inclination measuring instruments such as Patent Literature 1 comprises left hose 107a and right hose 107b that is made by severing one hose at its midpoint. The two independent hoses communicate with each other through the forked pipe 105 and the hollow 104 of the spindle 101.

CITATION LIST

Patent Literature 1: Japanese Unexamined Patent Application Publication No. 2011-137776
Patent Literature 2: Japanese Unexamined Patent Application Publication No. S60-235013
Patent Literature 3: Japanese Utility Model Application Publication No. H4-51618
Patent Literature 4: Japanese Utility Model Application Publication No. H4-57712
Patent Literature 5: Japanese Unexamined Patent Application Publication No. H7-301624
Patent Literature 6: Domestic Re-Publication of PCT Publication No. 2002-538025
Patent Literature 7: Japanese Unexamined Patent Application Publication No. 2005-139573

SUMMARY OF INVENTION

Technical Problem

The most serious problem in the instruments based on the measuring principle as described above is generation of bubbles in the liquid filled in the instrument, which interrupts accurate measurement.

One of the causes of generating bubbles is the air contained in tap water if used as measuring liquid. As countermeasure, it has been suggested to use boiled water or water diluted with ethylene glycol. Such ethylene glycol is colored, causing another problem of separation from water in long-term use.

Another cause of generating bubbles is the air gradually intruding through a gap between joints of the communicating hose during long-term use. For this reason, preferably the communicating hose is substantially seamless without joints halfway. The presence of joints at the central portion of the communicating hose as shown in FIG. 7 allows the air to let in. Once the air intrudes from around the central portion of the communicating hose, it is difficult to discharge, making subsequent measurement impossible.

The presence of joints also causes deteriorated sealer, resulting in liquid leak. The tubular liquid-level gauge normally has inner volume as small as 0.9 m in length and 7 mm in inner diameter. For this, even small leak leads to loss of liquid to be measured in the gauge, making measurement impossible.

Further, connecting the hose with the forked tube projecting from the spindle as shown in FIG. 7 causes folding or crushing at the connecting part when winding up the hose, which triggers deterioration or breakage of the hose and leads to liquid leak and air intruding.

The conventional art as shown in FIG. 7 has further problem that the hollow filled with water makes the entire drum heavier, causing difficulties in carrying and handling.

In order to wind one communicating hose on a drum in duplex without severing at the midpoint, the hose should be bent into U-shape at the central portion for fixing to the spindle. It is difficult to fix the hose that is bent into U-shape to the spindle having cylindrical shape without applying load. If the bent part of the hose receives the load, the part is prone to breakage. If the hose is folded or crushed during measurement, the flow of measuring liquid slows down, and so does the vertical flow in the tubular liquid-level gauges. It takes time to measure the liquid level at slow reaction speed in the gauge. In the worst case, the flow stops, making measurement impossible.

Addressing the problems discussed above, an object of the present invention is, in the instrument for measuring draft difference between both sides of a vessel, to achieve reliable and accurate measurement without generating bubbles in and leak of measuring liquid while increasing durability and reducing the weight.

Solution to Problem

For achieving the above purpose, the present invention is provided with the following constitution. Reference numerals in parentheses are those in the figures indicating the embodiments as shown below for reference.

According to a first aspect of the present invention, an instrument (1) for measuring draft difference between both sides of a vessel comprises two tubular liquid-level gauges (11) to be installed on portside and starboard, respectively, a communicating hose (41) for communicating the tubular liquid-level gauges (11), and a drum (51) for fixing the hose (41) at a central portion and for winding simultaneously a left half hose (41a) and a right half hose (41b). The instrument (1) is further provided with a hose hook (51c) projecting from an outer periphery of a spindle (51a) of the drum (51) for hooking the central portion of the hose (41) that is bent into U-shape, and a resin coil spring (42) attached to the central portion of the hose (41).

In the first aspect of the present invention, the instrument (1) may further be provided with an auxiliary fixing tape (43) that is looped around and fixed to the spindle (51a) for covering the hose (41) and the coil spring (42).

According to a second aspect of the present invention, an instrument (1) for measuring draft difference between both sides of a vessel comprises two tubular liquid-level gauges (11) to be installed on portside and starboard, respectively, a communicating hose (41) for communicating the tubular liquid-level gauges (11), and a drum (51) for fixing the hose (41) at a central portion and for winding simultaneously a left half hose (41a) and a right half hose (41b). The instrument (1) is further provided with a hose supporting sheet (45) comprises a plurality of sheet pieces fixed on an outer periphery of a spindle (51a) of the drum (51) and a groove formed with gaps between each of the pieces. The central portion of the hose (41) fits in the groove of the hose supporting sheet (45) for fixing to the drum (51).

In either of the aspects, it is preferable that a measuring liquid (W) to be filled in the tubular liquid-level gauges (11) and the communicating hose (41) comprises water and colored ethylene glycol, in which 3-5 vol. % of colored ethylene glycol is contained.

In either of the aspects, it is preferable that the instrument is further provided with an air-bleeding tube (13) that is made of transparent elastic body, connected between each one of the tubular liquid-level gauges (11) and the communicating hose (41), and to be pressed externally for discharging air existing in the hose (41).

Advantageous Effects of Invention

The instrument for measuring draft difference between both sides of a vessel according to the present invention adopts a method of winding the communicating hose on the drum in duplex. In this method the communicating hose is not severed into two hoses and remains one consecutive hose without joints, preventing liquid leak and air intrusion at the central portion of the communicating hose.

According to the present invention, the communicating hose is curved at the central portion and free from load to fix to the spindle of the drum, which prevents folding or crushing and enhances durability.

According to the present invention, the weight of the instrument can be saved since there is no need to fill the inside of the spindle with water as conventionally done.

According to the present invention, separation of the measuring liquid does not occur even after a long period of use owing to the optimal composition of colored ethylene glycol and water.

According to the present invention, provision of the air-bleeding tube enables efficient release of bubbles that are generated in the communicating hose.

DESCRIPTION OF EMBODIMENTS

Reference will now be made to exemplary embodiments of the invention with reference to the accompanying drawings.

Figure 1:
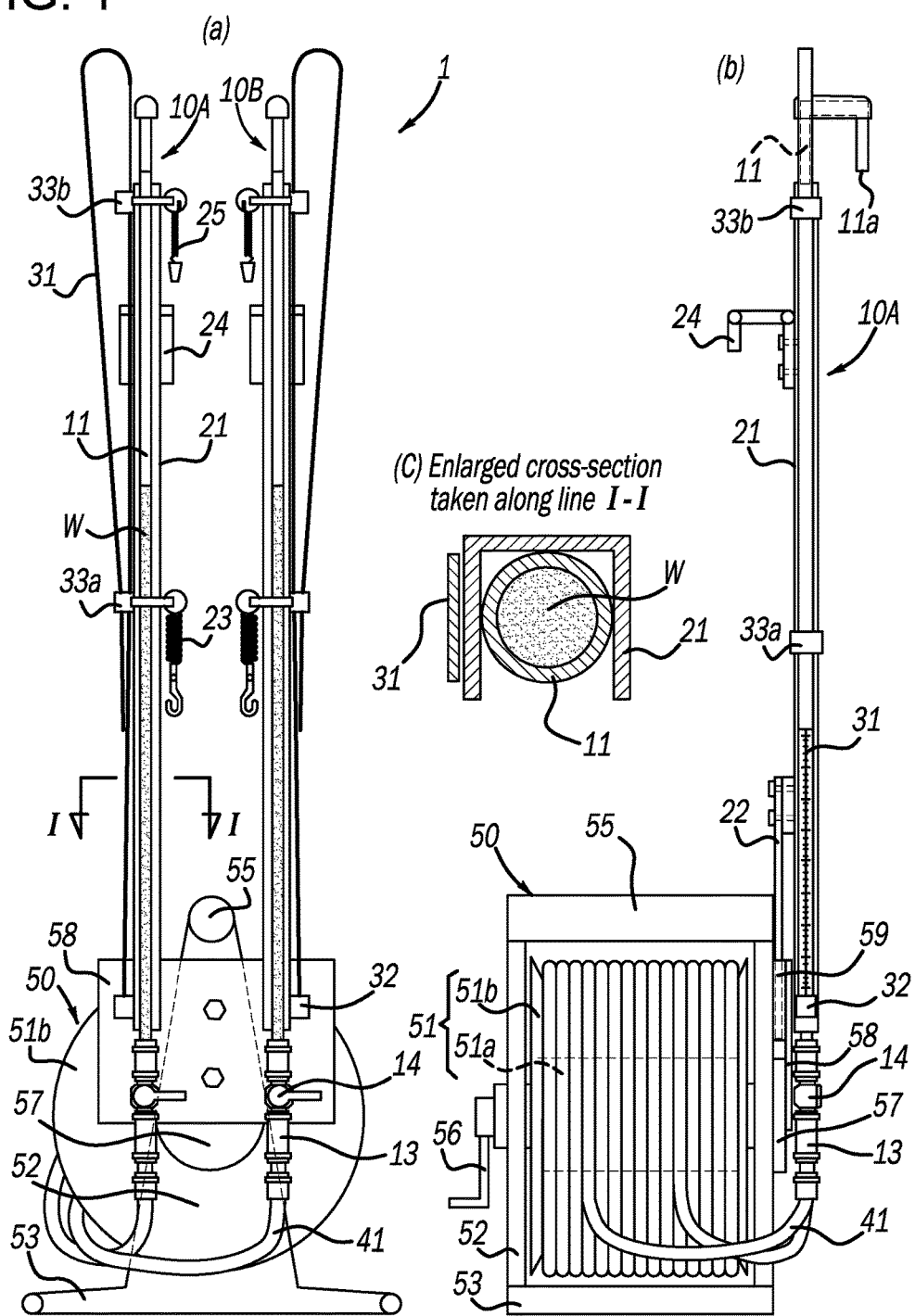
FIG. 1 shows an example of an instrument for measuring draft difference between both sides of a vessel in accordance with an embodiment of the present invention: (a) shows a front view; (b) shows a left side view; and (c) shows an enlarged sectional view taken along line I-I of (a).

(1) Outline of the Instrument for Measuring Draft Difference Between Both Sides of a Vessel FIG. 1 shows an example of the instrument for measuring draft difference between both sides of a vessel (hereinafter referred to as the instrument) in accordance with an embodiment of the present invention, in which (a) shows a front view, (b) shows a left side view, and (c) shows an enlarged sectional view taken along line I-I of (a). FIG. 1 shows the status of the instrument held in place.

As shown in FIG. 1, primary components of an instrument 1 are two measuring units 10A and 10B, a communicating hose 41 for communicating the measuring units through each bottom, and a drum unit 50 for winding the hose 41. The word "hose" as used herein refers to a flexible long tube regardless of its diameter. The fundamental constitution of the instrument 1 will be described hereinafter with reference to FIG. 1.

(1-1) Constitution of the Measuring Units

Since both measuring units 10A and 10B have the same constitution, one of the units 10A is described here.

The measuring unit 10A has a tubular liquid-level gauge 11 made of resin or glass, which is transparent and extends linearly. For instance, the tubular liquid-level gauge 11 has a length of 0.9 m and an inner diameter of 7 mm. The gauge 11 is arranged vertically either when in use or in place. The gauge 11 has at the top an opening 11a bending and facing downward for preventing rain and foreign matter from entering. The gauge 11 is filled with a measuring liquid W up to a certain level as described later.

The measuring unit 10A has a retainer 21 for holding the gauge 11. The retainer 21 is a rigid member extending along the gauge 11 for surrounding it and, for example, made of aluminum. However, for the purpose of checking the level of a measuring liquid W in the gauge 11, at least a front portion of the gauge 11 is left open.

A scale 31 is attached to the side of the retainer 21 with fixing bands 33a and 33b. The scale 31 is a thin metal strip-shaped member provided with tick marks and has both flexibility and upright habit. The scale 31 is held in place with the upper portion being bent in U-shape and the upper end being fixed by using lower one of the fixing band 33a. When uses, the scale 31 stands upright entirely with the upper end being released. The scale 31 is slidably attached along the retainer 21 so as to be lowered until the lower end comes in contact with a deck when used. For assisting fixation to the deck, a magnet 32 is attached to the lower end of the scale 31.

An insertion member 22 is attached on the back side of the retainer 21, which is inserted into a sheath 59 of the drum unit 50 so that the measuring unit 10A is held in place on the drum unit 50 when not in use.

On the back side of the retainer 21, a hook member 24 is provided, which is hung on a handrail of the broadside for fixing the measuring unit 10A when used. The hook member 24 may be made foldable when not in use.

The retainer 21 is further provided with a hooking coil spring 23 at a point below the hook member 24 for fixing the measuring unit 10A when used. A material of the coil spring portion is, for example, nylon.

A gauge plug 25 is attached near the upper end of the retainer 21 for closing an opening 11a of the gauge 11 when in place.

A valve 14 is attached at the lower end of the gauge 11, which is preferably a lever-type valve as shown in terms operability. The valve 14 is closed to prevent leak of the measuring liquid W when in place.

An air-bleeding tube 13 is disposed underneath the valve 14, which will be described later in detail with reference to FIG. 5.

One end of the communicating hose 41 is connected to the lower side of the air-bleeding tube 13 through an appropriate joint. The other end of the communicating hose 41 is connected to the lower end of the other measuring unit 10B. The communicating hose 41 is filled with the measuring liquid W.

(1-2) Fundamental Constitution of the Drum Unit

The drum unit 50 as shown in FIG. 1 is provided with a drum 51 for winding the communicating hose 41. The drum 51 has a spindle 51a and a pair of disks 51b disposed near both ends of the spindle 51a. The communicating hose 41 is wound around the spindle 51.

The communicating hose 41 at its central portion is fixed to the spindle 51a. The word "central portion" as used herein refers to a midpoint in the whole length of the hose and its vicinity area. The mechanism of fixing the hose 41 will be described later in detail with reference to FIG. 2-FIG. 4. A right half and a left half extending to the right and to the left, respectively, from the central portion of the hose 41 are wound around the spindle 51a in the same direction, meaning that the communicating hose 41 is wound in duplex.

Both ends of the spindle 51a are rotatably supported by a pair of side stanchions 52 that configures a drum housing. A pedestal 53 for stably supporting the drum unit 50 is linked across the lower ends of the side stanchions 52. A handle 55 for carrying the drum unit 50 is linked over the side stanchions 52.

A handgrip 56 that rotates integrally with the spindle 51a is attached to the outer side of one of the side stanchions 52. Rotating the handgrip 56 enables winding the communicating hose 41 around the spindle 51a.

A base plate 57 is fixed to the outer side of the other of the side stanchions 52, to which a support plate 58 in appropriate size is attached. A pair of sheaths 59 for holding the measuring units 10A and 10B in place are fixed between the support plate 58 on its backside and one of the side stanchions 52. Each insertion member 22 of measuring units 10A and 10B is inserted into each of the sheaths 59.

(1-3) Constitution of Communicating Hose

Figure 7:
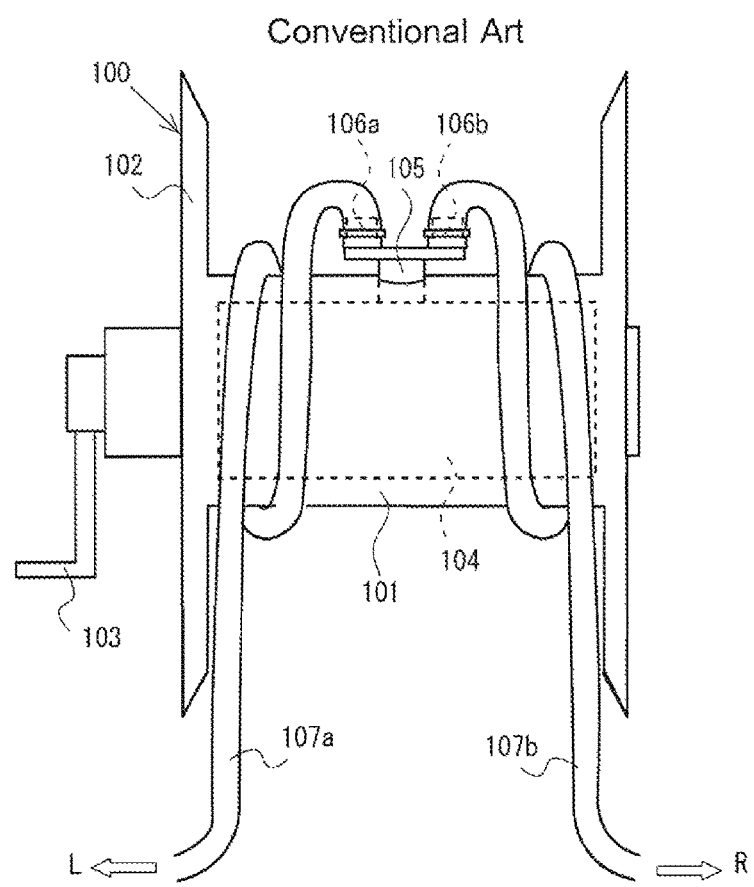
FIG. 7 shows conventional art for winding a communicating hose on a drum in duplex.

The communicating hose 41 according to the present invention is one consecutive seamless hose. It does not have a connecting portion via joints required in the conventional art as shown in FIG. 7. Accordingly at any portion other than both ends of the hose 41 air cannot intrude. The hose 41 is preferably transparent for better visibility of the measuring liquid W inside. For example, the hose 41 is made of flexible polyvinyl chloride and has an outer diameter of 5 mm to 7 mm.

The length of the hose 41 is required to be at least over the breadth of a deck so that the hose 41 is extended across the deck when used. The length should be long enough to allow for a margin in some cases of straddling objects placed on the deck. For example, in case of a large vessel, which is generally 60 m in breadth, the length of the hose should be about 70 m.

(1-4) Measuring Liquid

The measuring liquid W to be filled in the hose 41 and the tubular liquid-level gauge 11 is required to prevent generating bubbles and to be colored. Conventionally, as bubble-free solution, ethylene glycol solution has been used. If such solution is colored, the measuring liquid as a whole looks colored just after preparation of the liquid.

Conventional measuring liquid, in which a ratio of ethylene glycol is 13 vol. %, has a problem of separation of water and colored ethylene glycol after one-year use or so. When the drum is rotated for winding the hose while water and colored ethylene glycol remain separated, the ethylene glycol having high specific gravity accumulates near the drum's spindle whereas the water having low specific gravity moves away from the spindle due to a centrifugal difference between them. As a result, only water which is transparent is left in the tubular liquid-level gauge, causing difficulty in seeing the liquid level and making it unmeasurable.

According to the present invention, a ratio of colored ethylene glycol contained in the measuring liquid W is 3 vol. % to 5 vol. %, preferably 3 vol. %. Several minutes of boiling may be done for removing bubbles after preparing a mixture of water and ethylene glycol. Also the measuring liquid W may be prepared before summer and left as it is during summer for removing bubbles before filling.

It is verified that the instrument in the present invention does not cause separation of the measuring liquid W even after a long period of use for more than a year. Thus, according to the present invention, the measuring liquid W is semipermanently usable without replacing or replenishing.

(2) Mechanism of Fixing the Communicating Hose in the Drum Unit

Working Example 1

Figure 2:
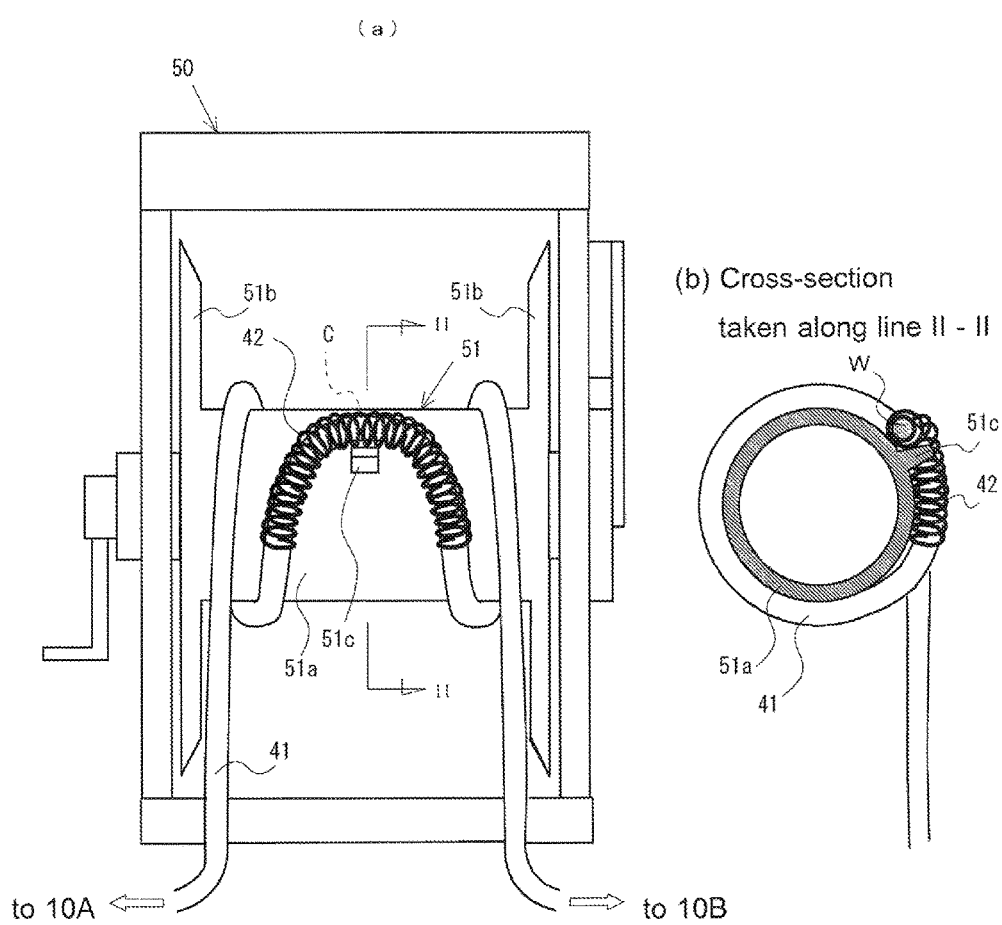
FIG. 2 shows an example of mechanism of fixing a communicating hose in a drum unit of the instrument shown in FIG. 1: (a) shows a view seen vertical to a drum spindle; and (b) shows a sectional view taken along line II-II of (a).

FIG. 2 shows an example of mechanism of fixing the communicating hose 41 in the drum unit 50 of the instrument shown in FIG. 1, in which (a) shows a view seen vertical to the spindle of the drum and (b) shows a sectional view taken along line II-II of (a).

The spindle 51a has a hose hook 51c projecting from the outer periphery of the spindle at the center in width direction. As shown in FIG. 2 (a), the communicating hose 41 bent in U-shape is hooked on the hose hook 51c such that the hose 41 is not folded or crushed and that the flow of measuring liquid W in the hose 41 is not hampered. Considering such extent, the width of hose hook 51c is determined. When hooked, a midpoint C on the whole length of hose 41 is almost at the same position as the hose hook 51c.

Around the U-shaped portion of hose 41, a resin coil spring 42 is wound, which is preferably made of nylon. Protection using the resin coil spring 42 reduces burden in winding and prevents folding or crushing at the central portion, leading to increased durability of the hose 41.

Figure 3:
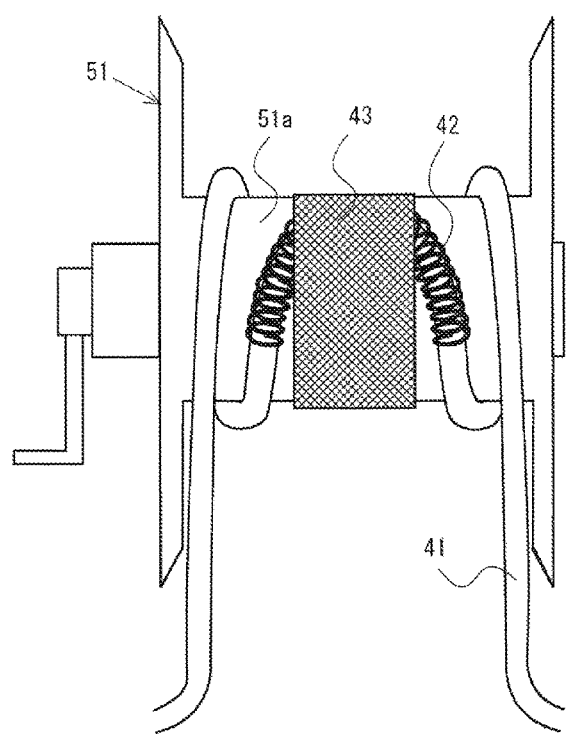
FIG. 3 shows an example of modified mechanism of fixing a communicating hose shown in FIG. 2.

FIG. 3 shows an example of modified mechanism of fixing the communicating hose 41 shown in FIG. 2. In this modification, an auxiliary fixing tape 43 is looped around the spindle 51a in such a way as to cover the hose 41 and the coil spring 42. The use of the auxiliary fixing tape 43 secures fixing the hose 41 around the spindle 51a.

(3) Mechanism of Fixing the Communicating Hose in the Drum Unit

Working Example 2

Figure 4:
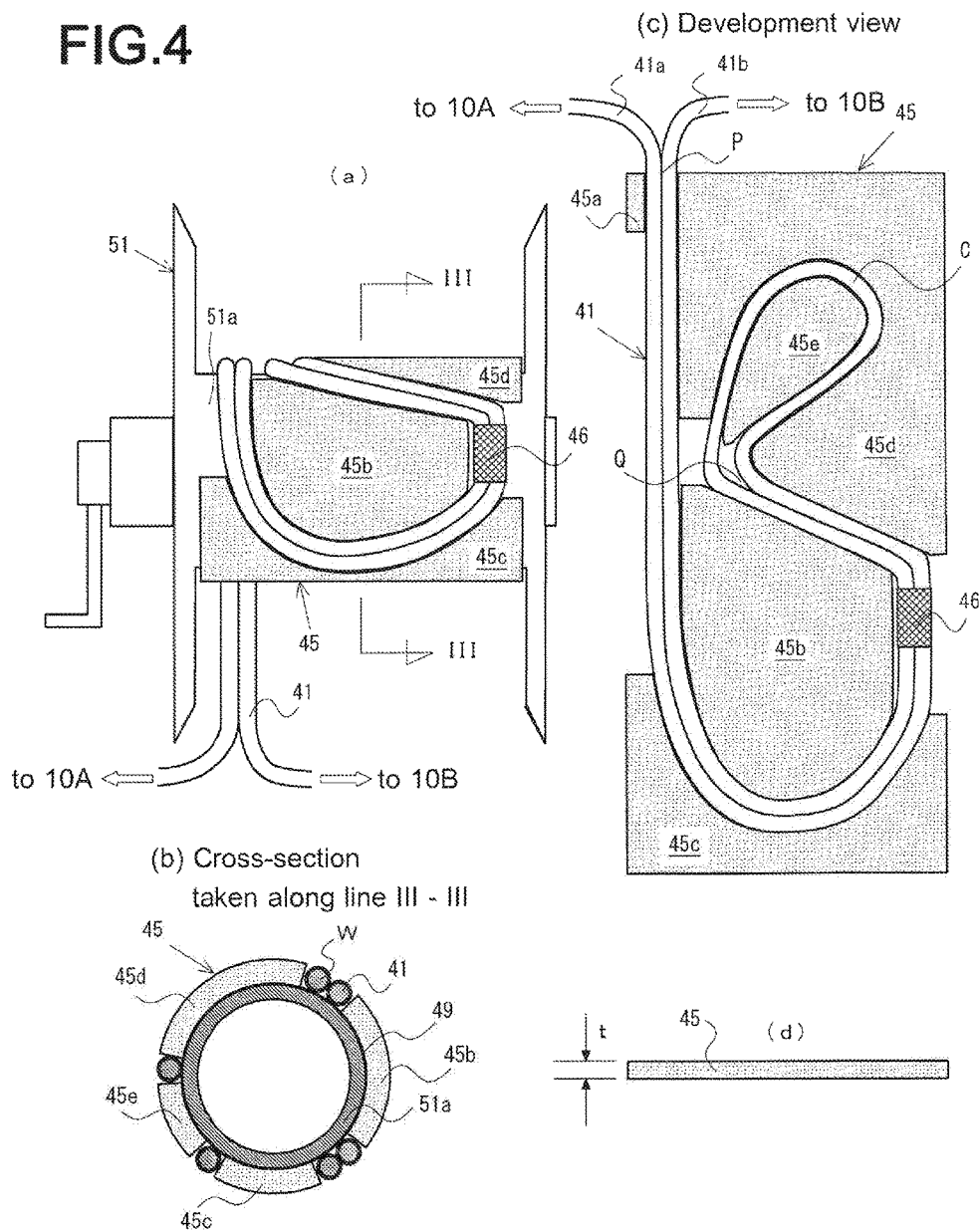
FIG. 4 shows another example of mechanism of fixing the communicating hose in the drum unit of the instrument shown in FIG. 1: (a) shows a view seen vertical to the spindle of the drum; (b) shows a sectional view taken along line III-III of (a); (c) shows a development view of a hose supporting sheet and the communicating hose; and (d) shows a side view of the developed hose supporting sheet.

FIG. 4 shows another example of mechanism of fixing the communicating hose 41 in the drum unit 50 of the instrument shown in FIG. 1, in which (a) shows a view seen vertical to the spindle of the drum, (b) shows a sectional view taken along line III-III of (a), (c) shows a development view of the hose supporting sheet 45 and the communicating hose 41; and (d) shows a side view of the developed hose supporting sheet 45.

As shown in FIGS. 4 (a) and (b), the hose supporting sheet 45 is looped over the outer periphery of spindle 51a and adhered using an adhesive 49. As shown in FIG. 4 (c), the contour of the developed hose supporting sheet 45 is almost rectangular. A plurality of sheet pieces in respective shapes, 45a, 45b, 45c, 45d, 45e constitute the hose supporting sheet 45. The hose 41 is fitted in and held by a consecutive groove that is made of gaps having predetermined width between two adjacent pieces, by which the central portion of the hose 41 is fixed on the spindle 51a.

The working example is described with reference to FIG. 4 (c). A left half hose 41a and a right half hose 41b are aligned parallel to each other and fitted in the groove from a point P to a point Q. A fixing tape 46 is used for bundling and fixing both hoses 41a and 41b on their way. The left half hose 41a and right half hose 41b separate from each other at the point Q and make a circle containing the midpoint C. The groove is shaped such that the hose 41 is not folded or crushed and that the flow of the measuring liquid W in the hose 41 is not hampered. It should be noted that the number and contour of the sheet pieces, and the shape of the groove are not limited to the illustrated example.

The hose supporting sheet 45 has a thickness t that is enough to embed the hose 41 in the groove, for example, the thickness t is set as 8 mm when the outer diameter of the hose 41 is 5 mm to 7 mm. The hose supporting sheet 45 preferably applies appropriate pressure on the hose 41 fitted in the groove for holding. For this reason, the hose supporting sheet 45 is preferably elastic body, for example, synthetic rubber.

(4) Air-Bleeding Mechanism of the Communicating Hose

Figure 5:
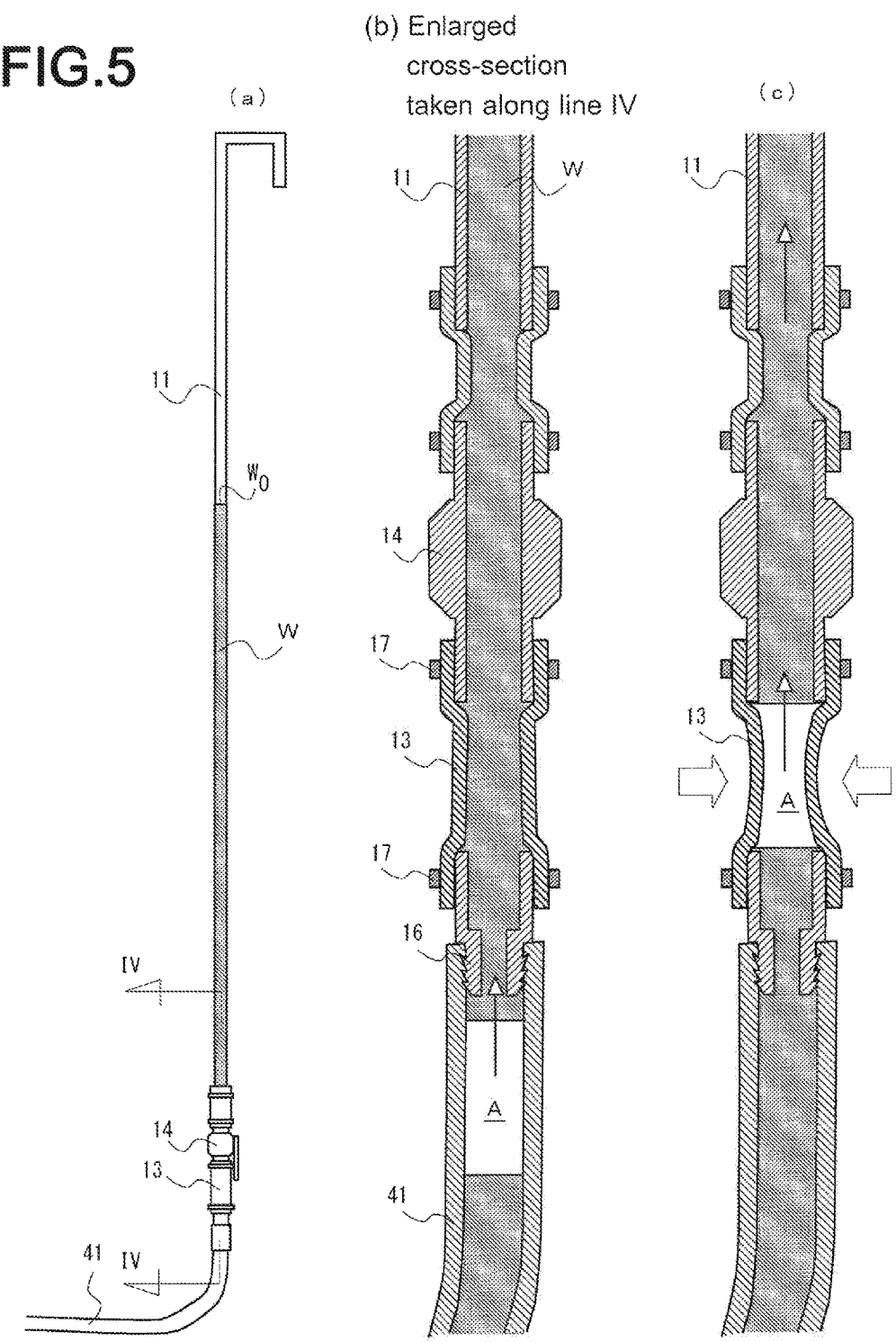
FIG. 5 shows a method of using an air-bleeding tube of the instrument shown in FIG. 1; (a) shows a schematic view indicating only the communicating hose, a tubular liquid-level gauge, and components therebetween; (b) shows an enlarged sectional view taken along line IV-IV of (a); and (C) shows a schematic view when the air-bleeding tube is operated in (b).

FIG. 5 shows a method of using the air-bleeding tube 13 of the instrument shown in FIG. 1, in which (a) shows a schematic view indicating only the communicating hose, the tubular liquid-level gauge, and components therebetween, (b) shows an enlarged longitudinal sectional view of IV of (a), and (C) shows a schematic view when the air-bleeding tube is operated in (b).

Even with the use of measuring liquid W that prevents generating bubbles, there is a possibility of air intrusion through a gap between joints or deteriorated sealers. This may cause a void A in the hose 41 as shown in FIG. 5 (b). Such void A caused in the measuring liquid W between two tubular liquid-level gauges 11 blocks accurate measurement of a liquid level $W_0$ of the gauges 11.

The air-bleeding tube 13 is inserted between the hose 41 and the gauge 11, and is transparent elastic body, for example, silicone rubber.

If the void A occurs as shown in FIG. 5 (b), the other tubular liquid-level gauge (not shown) is elevated to move the void A to the position of air-bleeding tube 13. Since the tube 13 is transparent, the existence of bubbles or the void A is visible. As shown in FIG. 5 (c), pressing the tube 13 with fingers allows the void A to rise and reach the liquid level $W_0$ before being discharged into the air. The pressing operation is normally repeated several times.

The air-bleeding tube 13 also contributes to an increase in durability of the instrument 1. The communicating hose 41 may get caught on various objects on the deck and be subject to large stress. In that case, the tube 13 whose material is most susceptible to damage serves as protection against damage to the hose 41. It is less expensive just to replace the tube 13 when damaged.

(5) Methods of Installation and Measurement

Figure 6:
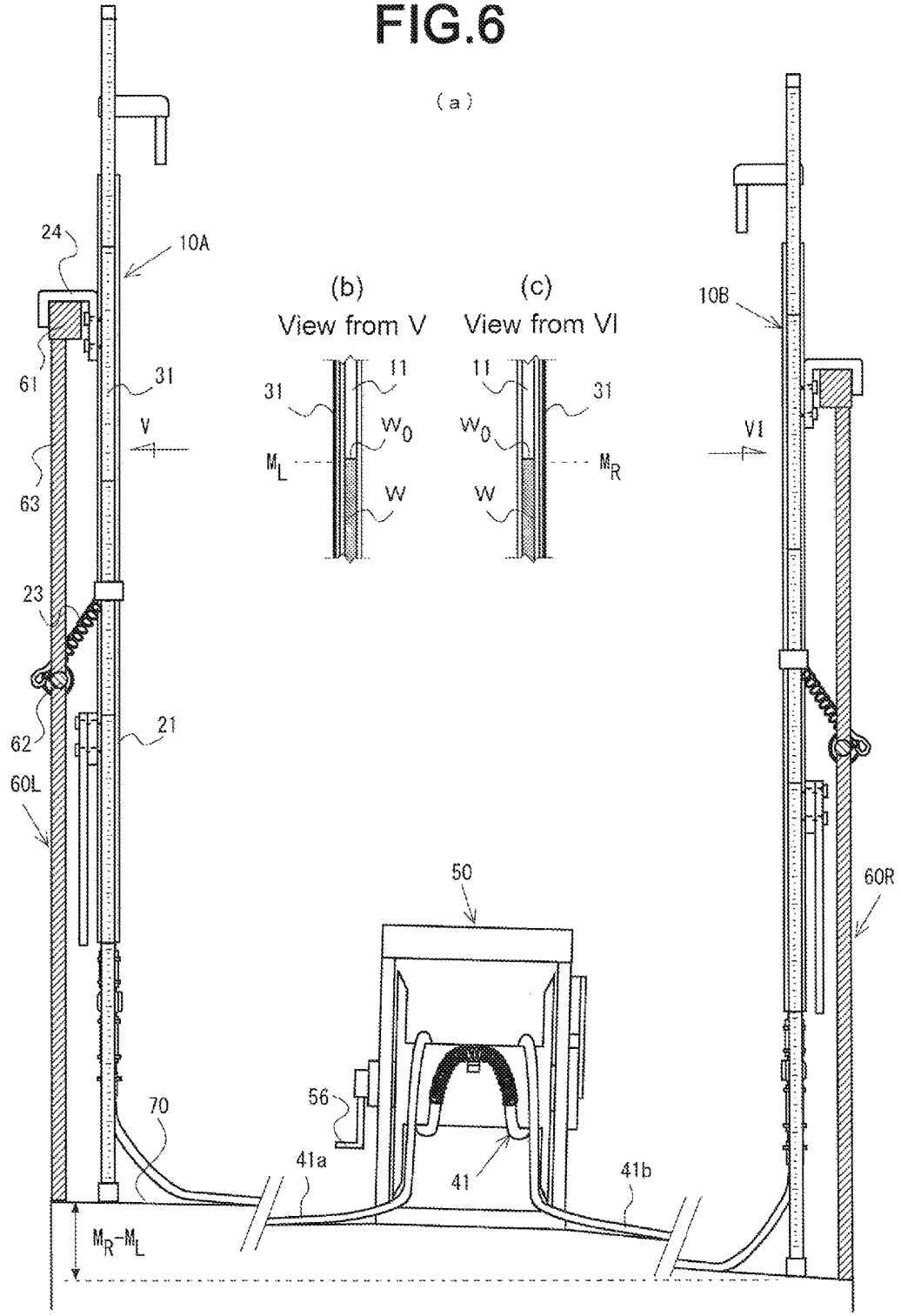
FIG. 6 shows a schematic view of installation and measurement of the instrument shown in FIG. 1: (a) shows measuring units installed on both sides of a vessel, respectively; (b) shows reading of a liquid level of the measuring unit on portside; and (c) shows reading of a liquid level of the measuring unit on starboard.

FIG. 6 shows a schematic view of installation and measurement of the instrument 1 shown in FIG. 1, in which (a) shows measuring units 10A and 10B installed on both sides of a vessel, respectively, (b) shows reading of a liquid level of the measuring unit 10A on portside, and (c) shows reading of a liquid level of the measuring unit 10B on starboard.

Hand rails 60L and 60R are on both ends of the deck 70 in the breadth direction, respectively, as shown in FIG. 6 (a). First, the instrument 1 held in place as shown in FIG. 1 is installed. Both measuring units 10A and 10B of the instrument 1 are detached from the drum unit 50. Next, the measuring unit 10A is installed on the handrail 60L on the portside, while the other measuring unit 10B is temporarily placed on the portside.

The hand rail 60L comprises an upper frame 61 and an mid frame 62 in horizontal direction, and a stanchion 63 in vertical direction. First, the hook member 24 is hooked on the upper frame 61. The hooking coil spring 23 is stretched to twist around the mid frame 62, and its hook is hooked on. The upper end of scale 31 that is bent is released to stand upright, which is then pulled down until it comes in contact with the deck 70. This process of installing measuring unit 10 takes only 20 to 30 seconds.

Next, the drum unit 50 is brought to and placed at the center of deck 70 while unwinding the hose 41.

Next, the measuring unit 10B is transferred from the portside to the starboard. For the purpose of working efficiency, the valve of measuring unit 10B is kept closed, whereas the valve of measuring unit 10A that has already been installed is opened. On the deck, its center is higher than sides, that is, the measuring unit 10B is lifted up when passing through the center of the deck. Even then, liquid leak from the opening of the measuring unit 10A is preventable as long as the valve of the measuring unit 10B is closed. Subsequently, the measuring unit 10B is installed on the handrail 60R on the starboard in the same way.

After installation, as shown in FIGS. 6 (b) and (c), each liquid level $W_0$ of tubular liquid-level gauges 11 is read by way of each scale 31. In the illustrated example, the measured value read at the measuring unit 10A is expressed as $M_L$, the measured value read at the measuring unit 10B is expressed as $M_R$. The difference between the measured values $M_L$ and $M_R$, $M_R-M_L$, equals the draft difference between the portside and the starboard.

After measurement, both measuring units 10A and 10B are detached and held in place on the drum unit 50. Turning the handgrip 56 of the drum unit 50 enables simultaneous winding of the left half hose 41a and the right half hose 41b in duplex. The process of detaching and holding the instrument 1 takes just 4 to 5 minutes.

A draft survey is normally carried out twice, before and after loading on a vessel, which should be done quickly within a time limit before departure. The instrument according to the present invention allows a draft survey to be done in a very short period of time.

REFERENCE NUMERALS

1 instrument for measuring draft difference between portside and starboard
10A, 10B measuring unit
11 tubular liquid-level gauge
11a opening
13 air-bleeding tube
14 valve
16 joint
17 fixing band
21 retainer
22 insertion member
23 hooking coil spring
24 hook member
25 gauge plug
31 scale
32 magnet
33a, 33b fixing band
41 communicating hose
42 resin coil spring
43 auxiliary fixing tape
45 hose supporting sheet
45a, 45b, 45c, 45d, 45e, sheet pieces
46 fixing tape
49 adhesive
50 drum unit
51 drum
51a spindle
51b disk
51c hose hook
52 side stanchions
53 pedestal
55 handle
56 handgrip
57 base plate
58 support plate
59 sheath
60L handrail on portside
60R handrail on starboard
61 upper frame
62 mid frame
63 stanchion
70 deck
W measuring liquid
C midpoint of hose
$M_R$, $M_L$ measured value

What is claimed is:
1. An instrument for measuring draft difference between both sides of a vessel, comprising:
two tubular liquid-level gauges installed on portside and starboard surfaces of the vessel, respectively;
a communicating hose for communicating between the tubular liquid-level gauges;

a drum for fixing the hose at a central portion thereof and for simultaneously winding a left half hose and a right half hose;

a hose hook projecting from an outer periphery of a spindle of the drum for hooking the central portion of the hose that is bent into a U-shaped configuration; and a resin coil spring attached to the central portion of the hose.

2. The instrument according to claim 1, further comprising an auxiliary fixing tape that is looped around and fixed to the spindle for covering the communicating hose and the resin coil spring.

3. The instrument according to claim 2, wherein a measuring liquid that is filled in the tubular liquid-level gauges and the communicating hose comprises water and colored ethylene glycol, in which 3-5 vol. % of colored ethylene glycol is contained therein.

4. The instrument according to claim 3, further comprising an air-bleeding tube that is made of a transparent elastic body and is connected between each one of the tubular liquid-level gauges and the communicating hose, and is pressed externally for discharging air existing in the communicating hose.

5. An instrument for measuring draft difference between both sides of a vessel, comprising:

two tubular liquid-level gauges installed on portside and starboard surfaces of the vessel, respectively;

a communicating hose for communicating between the tubular liquid-level gauges;

a drum for fixing the hose at a central portion thereof and for simultaneously winding a left half hose and a right half hose; and a hose supporting sheet comprising a plurality of sheet pieces fixed on an outer periphery of a spindle of the drum and a groove formed with gaps between each of the sheet pieces;

wherein the central portion of the hose fits in the groove of the hose supporting sheet for fixing to the drum.

6. The instrument according to claim 5, further comprising an auxiliary fixing tape that is looped around and fixed to the spindle for covering the communicating hose.

7. The instrument according to claim 6, wherein a measuring liquid that is filled in the tubular liquid-level gauges and the communicating hose comprises water and colored ethylene glycol, in which 3-5 vol. % of colored ethylene glycol is contained therein.

8. The instrument according to claim 7, further comprising an air-bleeding tube that is made of a transparent elastic body and is connected between each one of the tubular liquid-level gauges and the communicating hose, and is pressed externally for discharging air existing in the communicating hose.

* * * * *